(12) United States Patent
Mariat et al.

(10) Patent No.: US 10,913,537 B2
(45) Date of Patent: Feb. 9, 2021

(54) RETRACTABLE CHAIR FOR AN AIRCRAFT CABIN

(71) Applicants: Airbus Interiors Services, Toulouse (FR); Airbus Operations S.A.S., Toulouse (FR); AIRBUS SAS, Blagnac (FR)

(72) Inventors: Sylvain Mariat, Leguevin (FR); Laid Adda, Plaisance du Touch (FR); Béranger Chantal, Bretx (FR); Nicolas Ferrere, Moissac (FR); Nicolas Rios, Bessens (FR); Christophe Arnold, Toulouse (FR)

(73) Assignees: Airbus Interiors Services; Airbus Operations S.A.S.; AIRBUS SAS

( * ) Notice: Subject to any disclaimer, the term of this patent is extended or adjusted under 35 U.S.C. 154(b) by 399 days.

(21) Appl. No.: 15/938,517

(22) Filed: Mar. 28, 2018

(65) Prior Publication Data
US 2018/0281974 A1   Oct. 4, 2018

(30) Foreign Application Priority Data
Mar. 29, 2017   (FR) ...................................... 17 52625

(51) Int. Cl.
| B64D 1/06 | (2006.01) |
| B64D 11/06 | (2006.01) |
| B60N 2/30 | (2006.01) |
| B60N 2/70 | (2006.01) |
| B60N 2/34 | (2006.01) |

(52) U.S. Cl.
CPC .......... *B64D 11/0698* (2014.12); *B60N 2/309* (2013.01); *B60N 2/3063* (2013.01); *B60N 2/34* (2013.01); *B60N 2/7011* (2013.01); *B64D 11/064* (2014.12); *B64D 11/0647* (2014.12); *B64D 11/0691* (2014.12)

(58) Field of Classification Search
CPC ................ A47C 4/04; A47C 4/20; A47C 4/44
See application file for complete search history.

(56) References Cited

U.S. PATENT DOCUMENTS 2,497,412 A * 2/1950 Larin ...................... A47C 9/06
                                                        297/14
2,636,549 A * 4/1953 Geller ..................... D06F 81/06
                                                        248/240.2

(Continued)

FOREIGN PATENT DOCUMENTS

| DE | 102015110369 B3 | 11/2016 |
| EP | 0349762 A | 1/1990 |
| WO | 2014/179348 A1 | 11/2014 |

OTHER PUBLICATIONS

FR 1752625 Search Report dated Nov. 23, 2017.

*Primary Examiner* — Shin H Kim
(74) *Attorney, Agent, or Firm* — Lerner, David, Littenberg, Krumholz & Mentlik, LLP

(57) ABSTRACT

A retractable chair for an aircraft cabin which is connected in use to a wall of the cabin, and includes an articulated frame having a back and a seat; a support which is connected to the frame, and fitted such as to be mobile on the wall around an axis of rotation; and at least one covering stretched on the frame. The fact of pivoting the support relative to the wall makes it possible to be able to incline the back, which contributes towards improving the comfort of the chair.

8 Claims, 2 Drawing Sheets

(56) References Cited

U.S. PATENT DOCUMENTS

| | | | | |
|---|---|---|---|---|
| 6,089,651 A * | 7/2000 | Carmen | ............... | A47C 1/126 248/501 |
| 6,161,486 A * | 12/2000 | Boots | ............... | A47B 5/06 108/33 |
| 6,435,611 B1 * | 8/2002 | Walter | ............... | A47C 9/002 297/281 |
| 6,729,685 B1 * | 5/2004 | Ebalobor | ............... | A47C 9/06 108/13 |
| 6,896,322 B1 * | 5/2005 | Foy | ............... | A47C 1/126 297/129 |
| 7,175,231 B2 * | 2/2007 | Gallo | ............... | A47C 1/143 297/218.1 |
| 7,594,701 B2 * | 9/2009 | Kawabata | ............... | B64D 11/0639 297/452.63 |
| 7,740,310 B1 * | 6/2010 | Forster | ............... | A47C 7/66 135/96 |
| 8,061,766 B2 * | 11/2011 | Miller | ............... | A47C 7/62 297/41 |
| 8,075,059 B2 * | 12/2011 | Kim | ............... | A47C 1/146 297/16.1 |
| 9,095,216 B2 * | 8/2015 | Miller | ............... | A47C 4/46 |
| 9,770,097 B2 * | 9/2017 | Ehrreich | ............... | A47B 5/06 |
| 9,770,112 B2 * | 9/2017 | Wu | ............... | A47B 83/001 |
| 9,844,270 B2 * | 12/2017 | Windsor | ............... | A47C 1/121 |
| 10,464,679 B2 * | 11/2019 | Hoover | ............... | B64D 11/064 |
| 2009/0015040 A1 * | 1/2009 | Redmann | ............... | A47C 7/70 297/16.1 |
| 2012/0267920 A1 * | 10/2012 | Voris | ............... | A47C 4/045 297/16.1 |
| 2015/0048656 A1 * | 2/2015 | McCullough | ............... | F16C 11/10 297/16.1 |
| 2016/0376007 A1 * | 12/2016 | Meindlhumer | ............... | B64D 11/0641 297/14 |

* cited by examiner

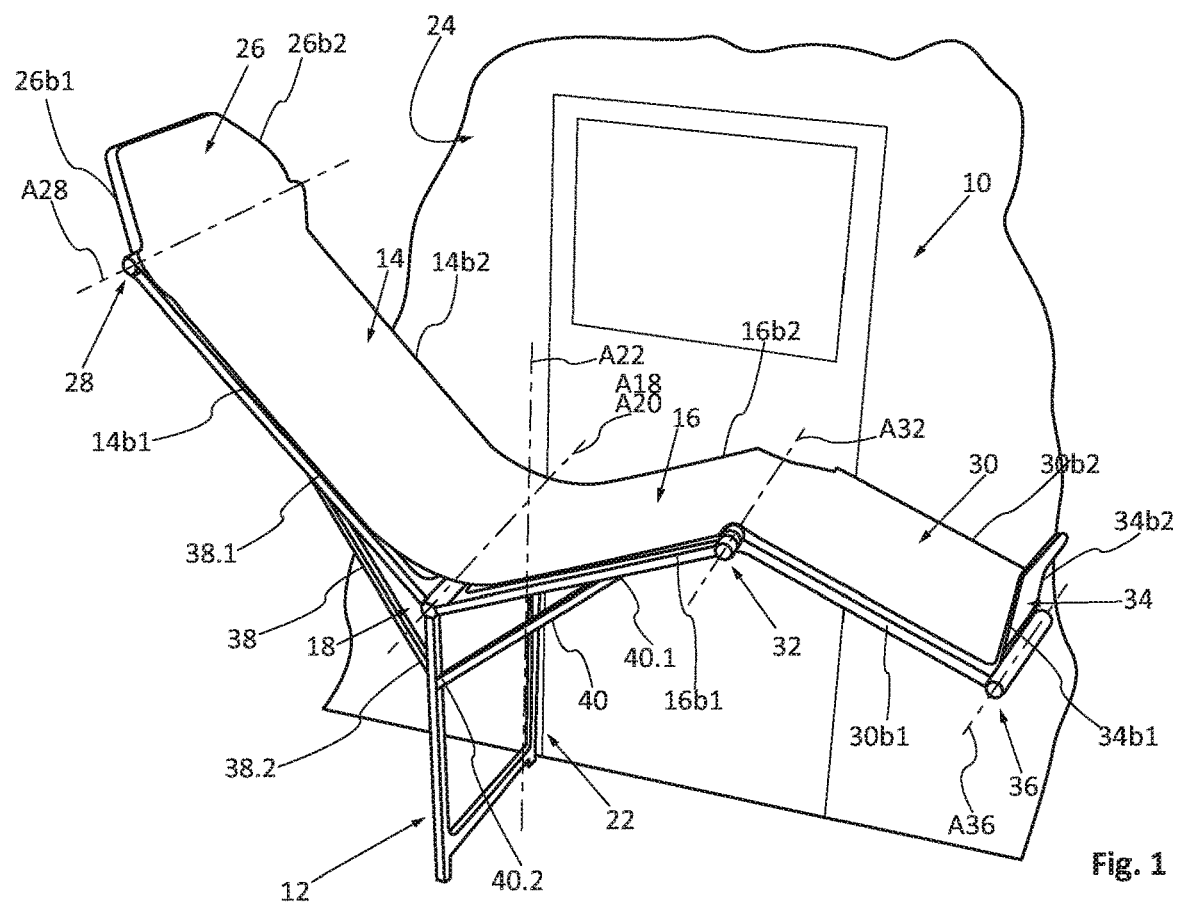
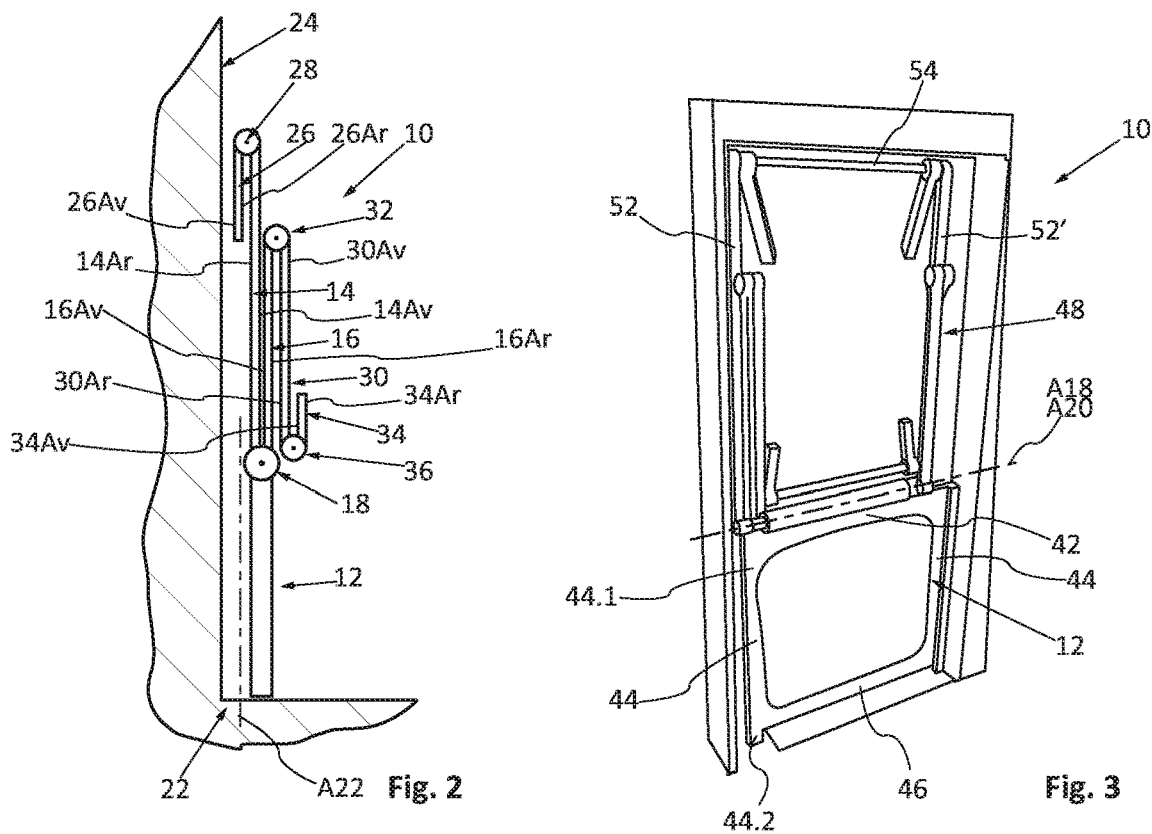
Fig. 1
Fig. 2
Fig. 3

RETRACTABLE CHAIR FOR AN AIRCRAFT CABIN

FIELD OF THE INVENTION

The present application relates to a retractable chair designed for the on-board personnel of an aircraft.

BACKGROUND OF THE INVENTION

According to a known configuration, a retractable chair comprises a back which is secured against a wall of an aircraft cabin, generally surmounted by a head-rest, and a seat which is fitted such as to pivot relative to a horizontal axis of pivoting positioned at the lower edge of the back, and integral with the wall. Thus, the seat is configured to occupy a retracted state, in which it is vertical and placed against the back, and a deployed state, in which it is horizontal, and allows a person to sit down.

This type of chair is convenient, since in the deployed state it provides a spare chair on which a person can strap himself in, in particular during the phases of landing or take-off, or when the aircraft is passing through an area of turbulence. In the retracted state, it frees the space occupied by the seat in the horizontal position, and allows people to pass by.

However, this type of chair with a fixed vertical back does not allow a person to relax.

In certain aircraft in general, designed for long-haul flights, there are cabins to allow the on-board personnel to sleep. These cabins have areas for lying down which are designed to allow people to sleep. However, these lying-down areas take up a relatively large amount of space.

BRIEF SUMMARY OF THE INVENTION

Aspects of the present invention may eliminate the disadvantages of the prior art by proposing a retractable chair which allows a person to relax.

For this purpose, the subject of the invention is a retractable chair for an aircraft cabin which is connected in use to a wall of the cabin, characterised in that the retractable chair comprises:
an articulated frame comprising a back and a seat;
a support which is connected to the frame, and fitted such as to be mobile on the wall around an axis of rotation, between a retracted state in which the support is in the folded-back position, and a deployed state in which the support is in the pivoted position; and
at least one covering stretched on the frame;
the support 12 being produced in the form of a framework which comprises:
a first, approximately horizontal cross-member 42 on which the back 14 and the support 12 are connected;
two uprights 44 which each comprise an upper end 44.1 connected to the first cross-member 42, and a second end 44.2 which is supported on the ground; and
a second cross-member 46 which connects the uprights 44 in the vicinity of their second end 44.2.

The fact of pivoting the support relative to the wall makes it possible to be able to incline the back, which contributes to improving the comfort of the chair, and allows a person to relax.

According to another characteristic, the axis of rotation is vertical.

According to another characteristic, the retractable chair comprises:
at least one first articulation which is configured to allow:
the seat to pivot relative to the back, between an approximately vertical position and a position which is inclined around a first horizontal axis of pivoting, and to connect the support to the seat;
the back to pivot relative to the support, around a second horizontal axis of pivoting, between an approximately vertical position and an inclined position; and
a second articulation which connects the support and the wall forming the axis of rotation.

According to another characteristic, the retractable chair comprises at least one reinforcement configured to support the back in the inclined position, and/or at least one reinforcement configured to support the seat in the inclined position.

According to one configuration, the retractable chair comprises two spaced reinforcements positioned on lateral edges of the back, and two spaced reinforcements positioned on lateral edges of the seat.

According to one embodiment, each reinforcement is telescopic, and comprises a first end connected to the back or to the seat at a point spaced from the first or second axis of pivoting, and a second end connected to the support at a point spaced from the first or second axis of pivoting.

According to another characteristic, the retractable chair comprises at least one secondary support surface and at least one secondary articulation which connects the said secondary support surface to the back or to the seat, and is configured to allow the said secondary support surface to pivot relative to the back or to the seat, around a secondary axis of pivoting, which is substantially horizontal, and parallel to the first and second axes of pivoting.

According to another characteristic, at least one of the articulations comprises a mechanism for regulation of the angular position of at least one of the elements from amongst the back, the seat, or the secondary support surface(s).

According to one embodiment, the second cross-member is supported on the ground.

BRIEF DESCRIPTION OF THE DRAWINGS

Other characteristics and advantages will become apparent from the following description of the invention, which is provided purely by way of example, with reference to the appended drawings, in which:

FIG. 1 is a view in perspective from a first viewing angle of a retractable chair in the deployed state, illustrating an embodiment of the invention;

FIG. 2 is a side view of the chair shown in FIG. 1, in the retracted state;

FIGS. 3 to 8 are views in perspective of the frame of the chair shown in FIG. 1, in different steps of the deployment.

DETAILED DESCRIPTION

Figure 4:
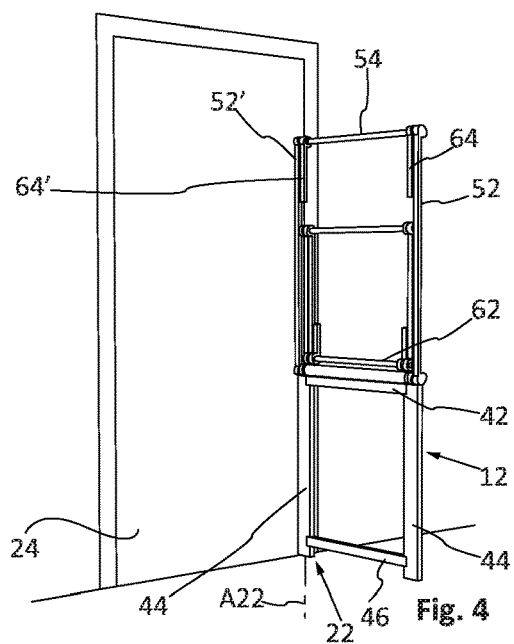

As illustrated in FIG. 1, a retractable chair 10 comprises:
a support 12;
a back 14;
a seat 16;
at least one first articulation 18, which connects the support 12, the back 14 and the seat 16, and is configured to allow:

the seat 16 to pivot relative to the support 12, around a first, approximately horizontal axis of pivoting A18, between an approximately vertical position and an inclined position;

the back 14 to pivot relative to the support 12, around a second, approximately horizontal axis of pivoting A20, between an approximately vertical position and an inclined position.

Thus, the back 14 and the seat 16 are mobile between a folded-back position, in which the back 14 and the seat 16 are in the vertical position, and placed against one another, and an unfolded position, in which the back 14 and the seat 16 are inclined, and form an angle of 90° or more.

The first and second axes of pivoting A18 and A20 coincide.

According to a characteristic of the invention, the retractable chair 10 also comprises a second articulation 22, which connects the support 12 to a wall 24, and is configured to allow the support 12 to pivot around a vertical axis of rotation A22, between a folded-back position in which the back 14 and the seat 16 are placed against the wall 24, with the first and second axes of pivoting A18, A20 being approximately parallel to the wall 24, and a pivoted position in which the back 14 and the seat 16 are approximately perpendicular to the wall 24, with the first and second axes of pivoting A18, A20 being approximately perpendicular to the wall 24.

Thus, the retractable chair 10 is configured to occupy a retracted state which corresponds to the folded-back position of the back 14 and the seat 16, and to the turned-down position of the support 12, and a deployed state which corresponds to the inclined position of the back 14 and of the seat 16, and to the pivoted position of the support 12.

According to a variant, in addition to the back 14 and the seat 16, the retractable chair comprises:

a head-rest 26 and a third articulation 28, which connects the head-rest 26 to the back 14, with the head-rest 26 being situated opposite the seat 26, and which articulation is configured to allow the head-rest 26 to pivot relative to the back 12 around a third axis of pivoting A28, which is approximately horizontal and parallel to the first and third axes of pivoting A18 and A20; and/or a leg-rest 30 and a fourth articulation 32, which connects the leg-rest 30 to the seat 16, with the leg-rest 30 being situated opposite the back 14, and which articulation is configured to allow the leg-rest 30 to pivot relative to the seat 16 around a fourth axis of pivoting A32, which is approximately horizontal and parallel to the second axes of pivoting A18 and A20.

According to another variant, in the presence of a leg-rest 30, the retractable chair 10 comprises a foot-rest 34 and a fifth articulation 36 which connects the foot-rest 34 and the leg-rest 30, with the foot-rest 34 being situated opposite the seat 16, and which articulation is configured to allow the foot-rest 34 to pivot relative to the leg-rest 30 around a fifth axis of pivoting A36, which is approximately horizontal and parallel to the first and second axes of pivoting A18 and A20.

Thus, in addition to the back 14 and the seat 16, the retractable chair 10 can comprise at least one other secondary support surface 26, 30, and at least one secondary articulation 28, 32, which connects the said secondary support surface 26, 30 to the back 14 or to the seat 16, and is configured to allow the said secondary support surface 26, 30 to pivot relative to the back 14 or to the seat 16 around a secondary axis of pivoting A28 and A32, which is approximately horizontal and parallel to the first and second axes of pivoting A18 and A20.

The back 14, the seat 16, the head-rest 26, the leg-rest 30 or the foot-rest 34 comprise respectively a front face 14Av, 16Av, 26Av, 30Av, 34Av corresponding to the face which is in contact with a person when the latter is installed in the retractable chair 10, and a rear face 14Ar, 16Ar, 26Ar, 30Ar, 34Ar corresponding respectively to the face opposite the front face.

The back 14, the seat 16, the head-rest 26, the leg-rest 30 or the foot-rest 34 each comprise two lateral edges which intersect at the axes of pivoting A18, A20, A32, A36, with the references 14b1 and 14b2 for the back 14, 16b1 and 16b2 for the seat 16, 26b1 and 26b2 for the head-rest 26, 30b1 and 30b2 for the leg-rest 30, and 34b1 and 34b2 for the foot-rest 34.

According to a preferred configuration shown in FIG. 2, in the retracted state the front face 14Av of the back 14 is placed against the front face 16Av of the seat 16, the front face 26Ar of the head-rest 26 is placed against the rear face 14Ar of the back 14, the rear face 30Ar of the leg-rest 30 is placed against the rear face 16Ar of the seat 16, and the front face 34Av of the foot-rest 34 is placed against the front face 30Av of the leg-rest 30.

In order to rigidify it, in particular in the deployed state, the retractable chair 10 comprises at least one reinforcement 38 configured to support the back 14 in the inclined position, and/or at least one reinforcement 40 configured to support the seat 16 in the inclined position. According to one configuration, the retractable chair 10 comprises two spaced reinforcements 38, positioned on the lateral edges 14b1 and 14b2 of the back 14, and two spaced reinforcements 40, positioned on the lateral edges 16b1 and 16b2 of the seat 16.

According to one embodiment, each reinforcement 38 is telescopic, and comprises a first end 38.1 connected to the back 14 at a point spaced from the second axis of pivoting A20, and a second end 38.2 connected to the support 12 at a point spaced from the second axis of pivoting A20. Each reinforcement 40 is telescopic, and comprises a first end 40.1 connected to the seat 16 at a point spaced from the first axis of pivoting A18, and a second end 40.2 connected to the support 12 at a point spaced from the first axis of pivoting A18.

According to one embodiment, the reinforcement 38 can consist of at least one lock which makes it possible to secure the chair on the wall 24, and/or at least one secondary support, not represented in the figures, and positioned to support the back 14, the seat 16 and/or the leg-rest 30.

Advantageously, at least one of the articulations 18, 28, 32, 36 comprises a mechanism for regulation of the angular position of at least one of the elements from amongst the back 14, the seat 16 or one of the secondary support surfaces (the head-rest 26, the leg-rest 30 or the foot-rest 34).

In order to reduce the mass of the retractable chair 10, the support 12 is made in the form of a framework which comprises:

a first, approximately horizontal cross-member 42, spaced from the ground, and to which the back 14 and the seat 16 are connected;

two uprights 44 which are arranged at each of the ends of the first cross-member 42, and each comprise an upper end 44.1 connected to the first cross-member 42, and a second end 44.2 which is supported on the ground;

a second cross-member 46 which connects the uprights 44 in the vicinity of their second end 44.2.

According to one configuration, the cross-member 46 is supported on the ground.

According to one embodiment, the second articulation 22 comprises at least one hinge which connects one of the uprights 44 of the support 12 the wall 24.

In order to reduce the mass of the retractable chair 10, the back 14, the seat 16, the head-rest 26, the leg-rest 30 and the foot-rest 34 are made in the form of an articulated frame 48 (shown in FIGS. 3 to 8), on which at least one covering 50 is stretched which forms a surface on which a person can make himself comfortable.

This covering 50 consists of canvas, fabric or leather, and can be padded in at least one area, such as, for example, at the headrest 26. According to one embodiment, a covering of this type can be made of plastic material, for example in the form of panels which can be embedded in the frame 48.

According to one embodiment, the frame 48 comprises:

in order to form the back 14, two first side-members 52, 52' positioned on the lateral edges 14$b$1 and 14$b$2 of the back 14, which comprise first ends connected to the first cross-member 42 of the support 12 by pivoting connections which form the second axis of pivoting A20, and second ends connected by a third cross-member 54;

in order to form the seat 16, two second side-members 56, 56' positioned on the lateral edges 16$b$1 and 16$b$2 of the seat 16, which comprise first ends connected to the first cross-member 42 of the support 12 by pivoting connections which form the first axis of pivoting A18, and second ends connected by a fourth cross-member 58;

in order to form the leg-rest 30, two third side-members 60, 60' positioned on the lateral edges 30$b$1 and 30$b$2 of the leg-rest 30, which comprise first ends connected to the fourth cross-member 58 of the seat 16 by pivoting connections which form the fourth axis of pivoting A32, and second ends connected by a fifth cross-member 62;

in order to form the head-rest 26, two fourth side-members 64, 64' positioned on the lateral edges 26$b$1, 26$b$2 of the head-rest 26, which comprise first ends connected to the third cross-member 54 of the back 14 by pivoting connections which form the third axis of pivoting A28;

in order to form the foot-rest 34, two fifth side-members 66, 66' positioned on the lateral edges 34$b$1, 34$b$2 of the foot-rest 34, which comprise first ends connected to the fifth cross-member 62 of the leg-rest 30 by pivoting connections which form the fifth axis of pivoting A36.

The functioning of the retractable chair 10 is described with reference to FIGS. 3 to 8.

In the retracted state illustrated by FIG. 3, the back 14 and the seat 16 are in the folded-back, approximately vertical position, and the support 12 is in the folded-down position. The support 12 and the back 14 are placed against the wall 24.

In a first stage, the support 12 pivots around the axis of rotation A22, such as to position it in the pivoted position, as illustrated in FIG. 4.

Figure 5:
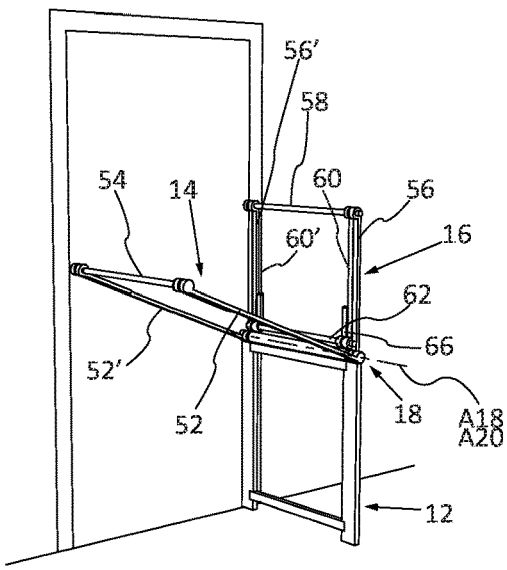

Subsequently, the back 14 pivots around the axis of pivoting A20, such as to position it in the inclined position, as illustrated in FIG. 5.

Figure 6:
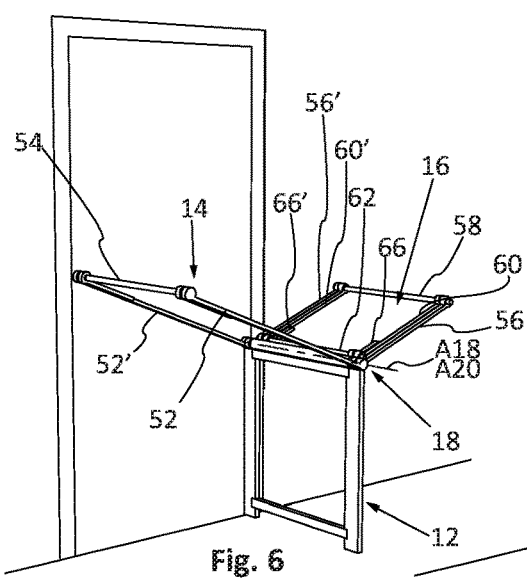

The seat 16 pivots around the axis of pivoting A18, such as to position it in the inclined position, as illustrated in FIG. 6.

Figure 7:
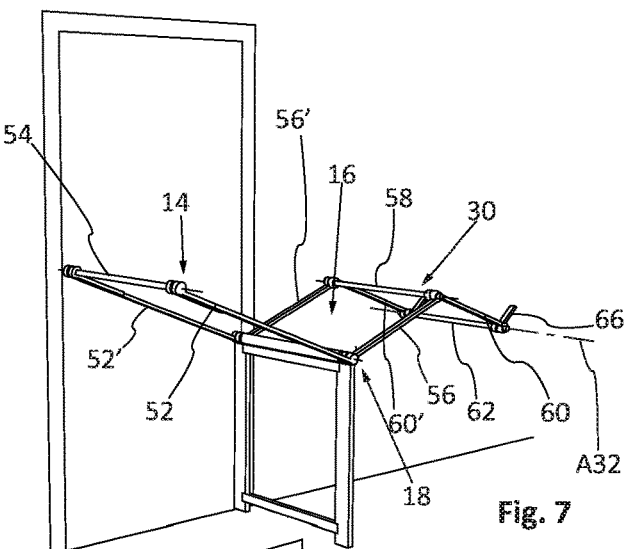

Subsequently, the leg-rest 30 pivots around the axis of pivoting A32, such as to position it in the unfolded position, as illustrated in FIG. 7.

Figure 8:
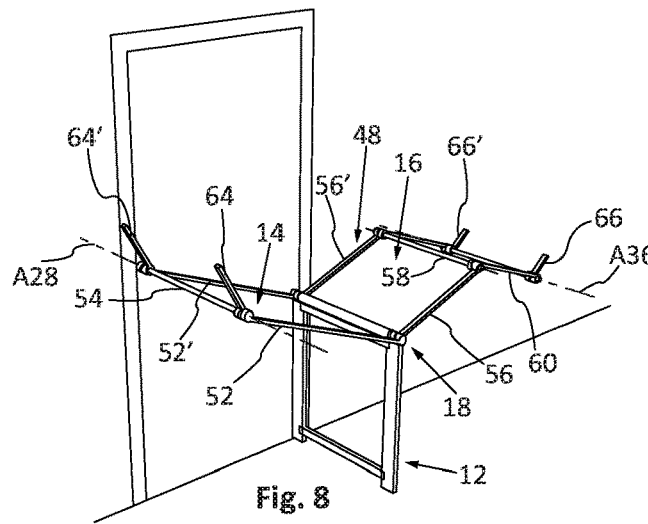
Figure 9:
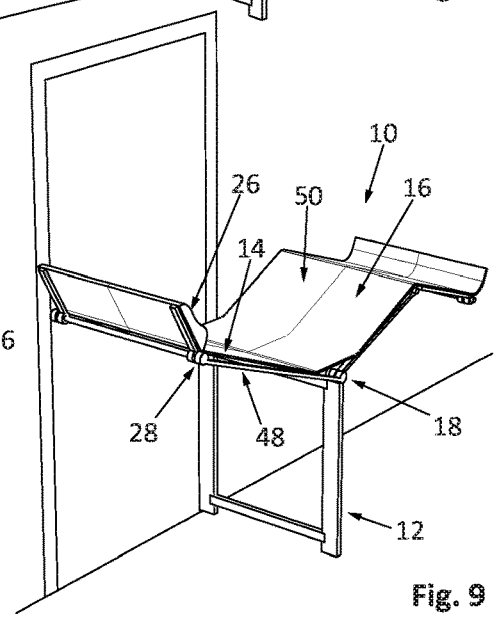
FIG. 9 is a view in perspective of a second viewing angle of the chair shown in FIG. 1, in the deployed state.

Finally, the head-rest 26 and the foot-rest 34 pivot respectively around axes of pivoting A28 and A36, in order to position them in the unfolded position, as illustrated in FIG. 8.

In order to store the retractable chair in the retracted state, the preceding steps are reproduced in the reverse order.

According to another functioning mode, the support 12 and the back 14 remain placed against the wall 24. Only the seat 16 is pivoted by 90° into the horizontal position. In this case, a retractable chair with the same configuration as in the prior art is obtained.

The invention is not limited to a retractable chair which is connected in use to a vertical wall. According to one embodiment, a retractable chair can be connected in use to a horizontal wall, such as, for example, the floor of an aircraft cabin. The second articulation 22 which connects the support 12 to the wall 24 can then be configured to allow the support 12 to pivot around an axis of rotation A22 which is horizontal between a turned-down position, in which the frame 48 is placed against the wall 24, and a pivoted position, in which the frame 48 is spaced from the wall 24. The axes of pivoting A18 and A20 and the axis of rotation A22 are then approximately parallel.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A retractable chair for an aircraft cabin which is connected in use to a wall of the cabin, the retractable chair comprising:
    an articulated frame comprising a back and a seat;
    a support connected to the frame, and fitted such as to be mobile on the wall around an axis of rotation, between a retracted state in which the support is in the folded-back position, and a deployed state in which the support is in the pivoted position; and
    at least one covering stretched on the frame;
    the support being produced in the form of a framework which comprises:
    a first, approximately horizontal cross-member on which the back and the support are connected;
    two uprights each of which comprises an upper end connected to the first cross-member, and a second end supported on the ground; and
    a second cross-member connecting the uprights in the vicinity of their second ends,
    wherein the axis of rotation is vertical.

2. The retractable chair for an aircraft cabin according to claim 1, further comprising:
    at least one first articulation configured to allow:
    the seat to pivot relative to the back, between an approximately vertical position and a position which is inclined around a first horizontal axis of pivoting; and
    the back to pivot relative to the support, around a second horizontal axis of pivoting, between an approximately vertical position and an inclined position; and
    a second articulation connecting the support and the wall forming the axis of rotation.

3. The retractable chair for an aircraft cabin according to claim 2, further comprising at least one reinforcement configured to support the back in the inclined position, and/or at least one reinforcement configured to support the seat in the inclined position.

4. The retractable chair for an aircraft cabin according to claim 3, wherein the at least one reinforcement configured to support the back comprises two spaced reinforcements positioned on lateral edges of the back, and
   wherein the at least one reinforcement configured to support the seat comprises two spaced reinforcements positioned on lateral edges of the seat.

5. The retractable chair for an aircraft cabin according to claim 3, wherein each reinforcement is telescopic, and comprises a first end connected to the back or to the seat at a point spaced from the first or second axis of pivoting, and a second end connected to the support at a point spaced from the first or second axis of pivoting.

6. The retractable chair for an aircraft cabin according to claim 2, further comprising at least one secondary support surface and at least one secondary articulation which connects said secondary support surface to the back or to the seat, and is configured to allow said secondary support surface to pivot relative to the back or to the seat, around a secondary axis of pivoting, which is substantially horizontal, and parallel to the first and second axes of pivoting.

7. The retractable chair for an aircraft cabin according to claim 6, wherein at least one of the first and second articulations comprises a mechanism for regulation of the angular position of at least one of the elements from amongst the back, the seat, or the secondary support surface(s).

8. The retractable chair for an aircraft cabin according to claim 1, wherein the second cross-member is supported on the ground.

\* \* \* \* \*